United States Patent [19]

De Winter et al.

[11] 4,245,036
[45] Jan. 13, 1981

[54] EMULSIFIER-FREE LATEXES AND PHOTOGRAPHIC LIGHT-SENSITIVE ELEMENTS CONTAINING THEM

[75] Inventors: Walter F. De Winter, 's-Gravenwezel; Marcel J. Monbaliu, Mortsel; August M. Mariën, Oevel; Antoine R. Van Rossen, Brustem, all of Belgium

[73] Assignee: AGFA-GEVAERT N.V., Mortsel, Belgium

[21] Appl. No.: 86,582

[22] Filed: Oct. 19, 1979

[30] Foreign Application Priority Data

Oct. 20, 1978 [GB] United Kingdom ............... 41446/78

[51] Int. Cl.$^3$ .......................... G03C 1/84; G03C 1/78; G03C 1/72; G03C 1/31
[52] U.S. Cl. .................................... 430/510; 430/529; 430/536; 430/537; 430/627; 430/628; 430/629; 430/631
[58] Field of Search ............... 430/537, 536, 627, 628, 430/629, 631, 529, 510

[56] References Cited

U.S. PATENT DOCUMENTS 3,411,911  11/1968  Dykstra ............................... 430/628

*Primary Examiner*—Richard L. Schilling
*Attorney, Agent, or Firm*—A. W. Breiner

[57] ABSTRACT

A latex is formed of a copolymer of 90 to 98% by weight of ethyl acrylate and 2 to 10% by weight of an ionogenic comonomer. The latter comprises in its structure a polymerizable ethylenically unsaturated bond, a hydrophobic chain comprising at least 8 carbon atoms, and a strong hydrophilic group taken from a sulpho group, a sulphato group or a phosphono group in acid or salt form.

Photographic layers are described wherein the above latex is used as plasticizer for gelatin.

3 Claims, No Drawings

EMULSIFIER-FREE LATEXES AND PHOTOGRAPHIC LIGHT-SENSITIVE ELEMENTS CONTAINING THEM

This invention relates to latexes and to photographic light-sensitive elements comprising a support and one or more layers formed from coating compositions comprising gelatin and emulsifier-free latices of polymeric products that are insoluble in water or photographic processing solutions.

Various synthetic resin emulsions have been used in coating compositions for photographic layers. It is known e.g. from U.S. Pat. No. 2,376,005 that the incorporation of an aqueous dispersion of a polymer of ethyl acrylate in a gelatin layer of a photographic light-sensitive element improves the properties thereof. The element possesses greater flexibility before and less brittleness after processing. Moreover, its flexibility factor before processing is substantially constant and is not subject to variations under changing atmospheric conditions.

The aqueous dispersion of polyethyl acrylate is formed by dispersing ethyl acrylate in water together with a surface-active emulsifying agent and with a catalyst and refluxing the dispersion obtained with agitation until polymerization is complete.

Conventional surface-active emulsifying agents used for dispersing ethyl acrylate in water are in general composed of two structural moieties. The first moiety is a hydrophobic chain, e.g. a saturated or unsaturated hydrocarbon chain comprising 10 to 18 carbon atoms, and the second structural moiety is a strongly hydrophilic group that is responsible for the water-solubility of the emulsifying agent.

However, in many instances these emulsifying agents are ultimately objectionable. For example, in coatings derived from aqueous latices by evaporation of water from a layer of such latices, the non-volatile emulsifying agents are left together with the polymer deposit. In many instances the water-soluble emulsifying agents seriously impair the quality of the coating. Since these emulsifying agents are in general not stable to diffusion, they can diffuse into adjacent layers of photographic elements and interfere with the photographic properties of these layers. When emulsifying agent migrates to the air-coating interface, subsequent difficulties may be expected, e.g. surface discoloration and water sensitivity. Migration of emulsifying agent to the coating-substrate interface can decrease adhesion of the coating to the substrate.

During the emulsion polymerisation of ethyl acrylate these emulsifying agents can be omitted by providing ionogenic comonomer units in the polymer chain. In U.S. Pat. No. 2,914,499 aqueous colloidal polymer dispersions are described wherein the polymer chain comprises a small but appreciable proportion of comonomer units of a sulpho ester of an α-methylene-carboxylic acid. The salts of the sulphoester-monomers such as the sodium salt of 2-sulphoethyl acrylate or methacrylate are in most instances water-soluble crystalline solids.

A disadvantage of these latices is that the diameter of their polymer particles is in general relatively large: 500 to 1000 nm, in special circumstances 150 to 400 nm, so that these latices are not suited to be used as plasticizers for gelatin in photographic materials. They are less compatible with gelatin solutions and as a result diminish the transparency of layers wherein they are present.

In a communication of M. S. Juany and I. M. Krieger in Polymer Preprints, 16, No. 1, April 1975, 120–124, polystyrene latices are produced wherein ionogenic comonomers are used in polymerization recipes containing no conventional emulsifiers. With the sodium salt of styrene sulphonic acid as ionogenic comonomer monodisperse styrene copolymers are produced having particle sizes from 180 to 350 nm. The sodium salt of 2-sulphoethyl methacrylate is also mentioned as ionogenic comonomer.

Owing to the large particle sizes, the above mentioned built-in emulsifying agents are not suitable for emulsion copolymerization with, e.g. ethyl acrylate, for photographic purposes. In order to produce clear and transparent photographic layers, it is indeed necessary that the polymer particles have an average particle diameter smaller than 100 nm and preferably smaller than about 70 nm.

In accordance with the present invention latices of polymers are provided that are exempt from the otherwise ballasting external emulsifying agents. In these latices prepared by emulsion copolymerization the polymer particles are internally stabilized in the aqueous colloidal dispersion by a polymerically combined emulsifier and have an average diameter smaller than 100 nm, preferably smaller than 70 nm. These latices are highly compatible with hydrophilic colloids, in particular gelatin, and hydrophilic colloid layers containing these latices are completely clear and transparent.

The latices of the present invention are latices of a copolymer of ethyl acrylate wherein the copolymer comprises 90 to 98% by weight of ethyl acrylate units and 2 to 10% by weight of units of an ionogenic comonomer corresponding to the formula:

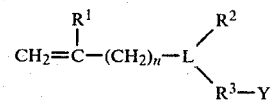

wherein:
R$^1$ is hydrogen or methyl,
n is 0 or an integer from 1 to 20, preferably 0 or 1,
L is a trivalent linking moiety of the group consisting of

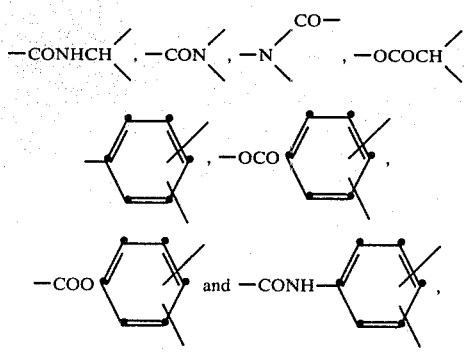

R$^2$ is a hydrogen atom or preferably an aliphatic branched or unbranched, saturated or unsaturated hydrocarbon group, e.g. alkyl or alkenyl of 1 to 20 C-atoms, R$^3$ is a monovalent chemical bond or a bivalent aliphatic hydrocarbon group, which may be interrupted by the group —COO— or —CONR— wherein R is hydrogen or $C_1$-$C_4$ alkyl, e.g. $R^3$ represents —$(CH_2—)_p$ wherein p is 0 or an integer from 1 to 4, —$(CH_2)_q$—COO—$(CH_2)_r$— or —$(CH_2)_q$—CONR—$(CH_2)_r$— wherein q is an integer from 1 to 20 and r is an integer from 1 to 4, and Y is a hydrophilic group selected from sulpho, sulphato and phosphono in acid or salt form, e.g. alkali metal salt, ammonium salt and organic onium salt, and wherein at least one of the groups represented by —$(CH_2)_n$—, $R^2$ and $R^3$ is or comprises a hydrocarbon chain of at least 8 C-atoms, the copolymer particles in the latex having an average diameter smaller than 100 nm.

The present invention likewise provides a photographic element comprising a support and one or more hydrophilic colloid layers including at least one light-sensitive silver halide emulsion layer, wherein at least one of said hydrophilic colloid layers is formed from a coating composition comprising a mixture of an aqueous solution of gelatin and a latex as defined above.

The stability of the latices produced directly by emulsion polymerization is ensured by the combined presence in the ionogenic comonomer of a long hydrophobic group comprising at least 8 carbon atoms, and of a strongly hydrophilic group formed by the sulphonic acid, sulphuric acid or of phosphonic acid group or salt thereof. The latex particles that are produced that way and not by dispersing techniques applying the copolymer in a solvent and putting it in a non-solvent whilst stirring, have an average diameter below 100 nm, in most cases even much below 70 nm so that the latices are excellently compatible with coating compositions comprising hydrophilic colloids, such as gelatin. Layers applied from the mixture of the present latices with gelatin coating compositions are completely clear and transparent after drying. Probably the average small diameter of the latex particles is due to the long straight-chain or branched-chain hydrocarbon group present in the ionogenic monomer and comprising at least 8 carbon atoms.

Representative examples of ionogenic monomers corresponding to the above general formula are the following:

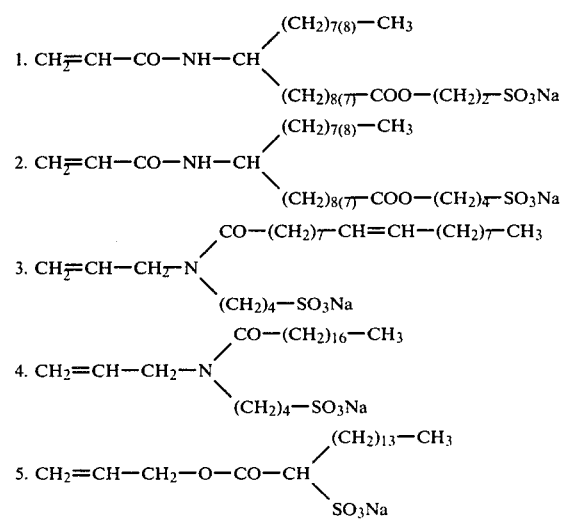

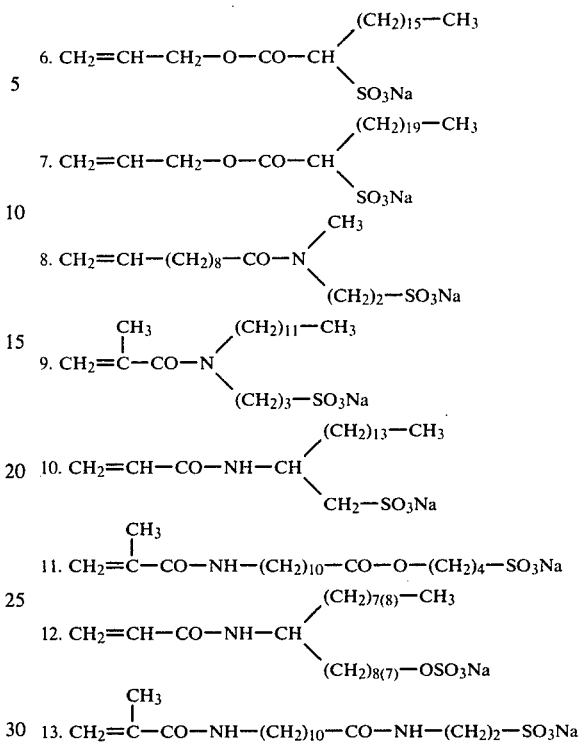

The manufacture of the above ionogenic monomers is described in the following preparations:

PREPARATION 1

(a) 106 g of acrylonitrile were added dropwise with stirring to 245 g of sulphuric acid while the temperature was kept below 20° C. Then 141 g of oleic acid were added dropwise. Stirring was continued for 3 h at about 30° C. whereafter the reaction mixture was allowed to stand overnight at room temperature. The black viscous oil that had formed was then poured into ice water. This mixture was stirred for 8 h during which period the ice water was renewed several times. Upon drying by evaporation 172 g of acrylamidostearic acid corresponding to the following formula were obtained:

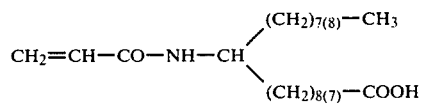

The sodium salt of the acrylamidostearic acid was formed by adding an equivalent amount of sodium hydroxide dissolved in methanol, followed by freeze-drying.

(b) A mixture of 35.3 g of the above acrylamidostearic acid and 12.6 g of 2-hydroxyethane sulphonic acid in 500 ml of benzene was refluxed in a Dean-and-Stark apparatus for 24 h. Traces of m-dinitrobenzene and of hydroquinone were added as polymerization inhibitors. After cooling the benzene was decanted and the residue was dissolved in water and neutralised with 1 N sodium hydroxide, whereafter the solution was freeze-dried.

Yield: 45 g of ionogenic monomer no. 1.

PREPARATION 2

37.6 g of the sodium salt of acrylamidostearic acid (see Preparation 1), 20.4 g of butanesultone, 50 mg of hydroquinone and 50 mg of m-dinitrobenzene were dissolved in 100 ml of methanol. The solution was concentrated by evaporation, whereafter the mixture was filtered and dried under vacuum.

Yield: 40 g of ionogenic monomer no. 2.

PREPARATION 3

A solution of 57 g of allylamine and 136 g of butanesultone in 1 l of methanol was stirred a room temperature for 48 h. After evaporation, washing of the residue with ether and drying under vacuum, 70 g of N-allyl-aminobutane sulphonic acid were obtained.

19.3 g of the N-allyl-aminobutane sulphonic acid and 4 g of sodium hydroxide were dissolved in 200 ml of water, whereafter 30.05 g of oleyl chloride and 100 ml of 1 N sodium hydroxide were dropwise added simultaneously with stirring.

After stirring for 1 h at room temperature the solution was freeze-dried. The product was washed with acetone and dried under vacuum.

Yield: 40 g of ionogenic monomer no. 3.

PREPARATION 4

The procedure of preparation 3 was repeated with the sole difference that the 30.05 g of oleyl chloride were replaced by 30.25 g of stearyl chloride.

Yield: 48 g of ionogenic monomer no. 4.

PREPARATION 5

250 g of stabilized sulphuric anhydride were added dropwise with stirring to a mixture of 500 g of palmitic acid and 1500 ml of dry chloroform. Thereby the temperature rose to about 45° C. and a dark coloured solution was formed. This solution was heated at boiling temperature with stirring and refluxed for 90 min. Thereafter the solution was cooled and placed in a refrigerator at −20° C. A precipitate formed that was sucked off and dried under vacuum.

Yield: 550 g of alpha-sulphopalmitic acid.

100 g of this alpha-sulphopalmitic acid, 500 ml of allyl alcohol, 100 mg of hydroquinone and 100 mg of m-dinitrobenzene were refluxed for 24 h. The dark solution was cooled, neutralised with 300 ml of 1 N sodium hydroxide in methanol, and cooled in a refrigerator. The precipitate formed was sucked off and dried under vacuum.

Yield: 109 g of ionogenic monomer no. 5.

PREPARATIONS 6 AND 7

Preparation 5 was repeated but the palmitic acid was replaced by stearic acid and behenic acid respectively.

Yield: ionogenic monomers nos. 6 and 7.

PREPARATION 8

A mixture of 100 g of 10-hendecenoic acid, 250 ml of thionyl chloride and 1 ml of dimethylformamide was boiled for 3 h. Thereafter the thionyl chloride was evaporated under vacuum and the residue was distilled.

Yield: 70 g of 10-hendecenoyl chloride.

10.125 g of the above 10-hendecenoyl chloride dissolved in 10 ml of acetone were dropwise added with stirring to a solution of 8.05 g of sodium-methyl-tauride and of 4.62 g of sodium hydrogen carbonate in 50 ml of water. Stirring was continued for 2 h at room temperature whereafter precipitation occurred in acetone. The precipitate was dried under vacuum.

Yield: 10.3 g of ionogenic monomer no. 8.

PREPARATION 9

A solution of 185 g of dodecylamine and 122 g of propanesultone in 2 l of xylene was refluxed for some hours and thereafter cooled in ice water. The precipitate was stirred in acetone, sucked off and dried under vacuum.

Yield: 300 g of product.

30.7 g of the above formed product was dissolved in 4 g of sodium hydroxide and 100 ml of water. After cooling in ice water 4 g of sodium hydroxide in 100 ml of water and 10.45 g of methacryloyl chloride were simultaneously added dropwise, the stirring being continued for 30 min. Thereafter the clear solution formed was freeze-dried.

Yield: 36 g of ionogenic monomer no. 9.

PREPARATION 10

290 g of 1-hexadecene were dropwise added at −10° C. to a solution of 150 ml of acetic acid in 200 ml of methylene chloride, whereafter at the same temperature a solution of 100 g of stabilized sulphuric anhydride in 230 g of acetic acid were added with stirring. The reaction mixture was then stirred at room temperature for 2 h, whereafter at 0° C. were consecutively and dropwise added: 15 ml of water, 137.8 g of acrylonitrile and 130 g of sulphuric acid. Stirring was continued for 48 h at 40° C., followed by evaporation drying. The product obtained was dissolved in methanol, neutralised with 4 N sodium hydroxide in methanol, sucked off and crystallized from a mixture of 2 l of alcohol and 400 ml of water.

Yield: 200 g of ionogenic monomer no. 10.

PREPARATION 11

100.5 g of 11-amino-hendecanoic acid were dissolved at 40° C. in a solution of 21 g of sodium hydroxide in 500 ml of water to which 250 mg of hydroquinone had been added as polymerisation inhibitor. Thereafter 52.25 g of methacryloyl chloride and a solution of 20 g of sodium hydroxide in 100 ml of water were added dropwise at the same temperature and simultaneously. As a result the temperature rose to 50° C.

Stirring was continued for about 30 min, and the mixture was allowed thereby to cool to room temperature. After washing with 1 l of water containing 2 N of hydrochloric acid the product was sucked off and dried under vacuum.

Yield: 117 g of 11-methacryloylamino-hendecanoic acid.

To form the sodium salt, the above carboxylic acid was dissolved in methanol, and admixed with an excess of sodium hydroxide dissolved in methanol.

Yield: 37 g of the sodium salt.

14.5 g of this sodium salt were placed in a reaction vessel whereupon 13.6 g of butanesultone and 200 ml of methanol were added. The mixture was refluxed for 16 h, the solvent was evaporated under vacuum, and the residue was thoroughly washed with acetone, sucked off and dried under vacuum.

Yield: 17 g of ionogenic monomer no. 11.

PREPARATION 12

The sodium salt of 9(10)-acrylamidostearyl sulphate was prepared as described in U.S. Pat. No. 3,640,922, Example 7.

PREPARATION 13

A mixture of 269 g of 11-methacryloylamino-hendecanoic acid (see preparation 11), 500 ml of thionyl chloride, 5 ml of dimethylformamide and 1 g of m-dinitrobenzene were stirred and heated to reach reflux temperature. Refluxing was continued for 1 h and the excess of thionyl chloride was removed by evaporation under reduced pressure. The residual product being 11-methacryloylamino-hendecanoyl chloride was used as such in the preparation of the monomer 13.

A solution of 28.8 g of 11-methacryloylamino-hendecanoyl chloride in acetone and 100 ml of 1 N aqueous sodium hydroxide were added dropwise through separate funnels but simultaneously and with stirring to a solution of 12.5 g of taurine in 100 ml of 1 N aqueous sodium hydroxide. After the dropwise addition the reaction mixture was stirred for another hour. The pH was kept at or above 7 by the use of additional 1 N sodium hydroxide solution if necessary. The temperature rose to about 35° C. Thereupon the reaction mixture was cooled and filtered. The monomer was separated by freeze-drying or by precipitation with acetone.

Yield: 35 g of ionogenic monomer 13.

In order to form the latices ethyl acrylate and the ionogenic comonomer are dispersed in water in the desired proportions together with a catalyst such as potassium persulphate, and the dispersions are heated with stirring at 80° C. until copolymerization is complete.

The particle size of the emulsion copolymer formed depends on the content of ionogenic comonomer present in the copolymer. Polymer particles having an average diameter smaller than 100 nm, in most cases smaller than 70 nm, are obtained when the copolymer comprises between 2 and 10% by weight, preferably between 2 and 5% by weight, of ionogenic comonomer. With some of the ionogenic comonomers the ratio can be much larger than 10% by weight, but thereby the plasticizing properties of the copolymer for the gelatin are gradually impaired more and more. Therefore at most 10%, preferably at most 5%, of ionogenic comonomer units are present in the polymer.

The emulsifier-free latices according to the invention may be incorporated in coating compositions for the manufacture of gelatin-containing layers of a photographic light-sensitive element. This layer may be the light-sensitive emulsion layer itself, a subbing layer, an antistress layer, an antihalation layer or any other auxiliary layer of the photographic element. The concentration of the present ethyl acrylate copolymers in the dispersions (latices) may be adapted as desired. They are preferably prepared in such a way that the actual concentration of the copolymer in the latex is comprised between about 15 and 40% by weight. The emulsifier-free copolymer latices are mixed with the aqueous gelatin-containing coating compositions preferably in such an amount that between 5 and 50% by weight, more preferably between about 15 and 25%, of dry copolymer particles are present with respect to the combined dry weight of gelatin and copolymer particles.

In the latices described herein for use as plasticizer in gelatin layers the ethyl acrylate units are the plasticizing comonomer units. The ethyl acrylate units may be partly replaced by other plasticizing monomers, whose homopolymers have a glass transition temperature below 0° C., e.g. methyl acrylate and butyl acrylate.

The following examples illustrate the invention without, however, restricting it thereto.

EXAMPLE 1

350 ml of demineralized water, 2 g of ionogenic monomer no. 5, 25 g of ethyl acrylate, and 125 mg of potassium persulphate were introduced in a reaction vessel of 1 liter, stirred, and heated at 80° C. Once polymerisation had started 73 g of ethyl acrylate and a solution of 375 mg of potassium persulphate in 50 ml of water were simultaneously and dropwise added in such a manner that ethyl acrylate continued to reflux. After complete addition polymerization was continued for 2 h. The reaction mixture was demonomerized, cooled to room temperature and filtered.

Concentration of polymer in the latex: 17.95% by weight.

Average particle size: 62 nm.

The copolymer formed comprised 98% by weight of ethyl acrylate and 2% by weight of ionogenic monomer no. 5.

At room temperature the latex formed was stable for more than 9 months.

To 1 l of a silver halide emulsion containing 100 g of gelatin, 100 ml of the above prepared latex were added preferably just before coating on a support or at some other state of its manufacture.

After drying, a photographic element was obtained having greater flexibility in comparison with an element wherein the addition of latex of the copolymer of ethyl acrylate and ionogenic monomer had been omitted The photographic element of the invention possessed less brittleness after processing in the photographic baths.

EXAMPLES 2 TO 10

The latex preparation described in example 1 was repeated with the sole difference that the 2 g of ionogenic monomer no. 5 were replaced by equal amounts of different ionogenic monomers as indicated in the following table. The following results were obtained.

| Ex. | Ionogenic monomer | Weight concentration of polymer in latex (%) | Average particle size in nm | Stability of latex at room temperature in months | Compatibility with gelatin (50:50% by weight) |
|---|---|---|---|---|---|
| 2 | No.1 | 17.95 | 58 | >4 | clear |
| 3 | 2 | 15.0 | 69 | >4 | clear |
| 4 | 3 | 17.5 | 67 | >4 | clear |
| 5 | 4 | 20.0 | 81 | >4 | ±clear |
| 6 | 6 | 19.3 | 70 | >4 | clear |
| 7 | 7 | 18.5 | 67 | >4 | clear |
| 8 | 8 | 18.5 | 82 | >4 | ±clear |
| 9 | 9 | 20 | 69 | >4 | clear |
| 10 | 10 | 18.4 | 67 | >4 | clear |

For measuring the compatibility of the emulsifier-free latices of the invention with aqueous gelatin coating compositions, the latices were added in such a quantity that equal dry amounts of gelatin and of copolymer of ethyl acrylate were present. After coating and drying, the transparency of the layers was examined. Notwithstanding the exaggerated large amounts of latices added the transparency was excellent with the exception of two cases, namely in examples 5 and 8, where a very slight haziness was observed. Of course this was due to the somewhat greater particle size and to the extremely high amount (50%) of latex added.

The stability of the latices was also examined and proved to be more than 9 months in all cases.

EXAMPLES 11 TO 22

The influence on the particle size of the ratio of ionogenic comonomer present in the copolymer was measured. Therefore the polymerisation process of example 1 was repeated with the difference that varying ratios of ethyl acrylate and of ionogenic comonomers nos. 1 and 5 were used. The results are listed in the following table.

| Ex. | latex ethyl acrylate % | latex ionogenic monomer % | weight concentration of polymer in latex % | average particle size | compatibility with gelatin (50:50% by weight) |
|---|---|---|---|---|---|
| | | ionogenic monomer No. 5 | | | |
| 11 | 99.8 | 0.2 | 18.2 | 81 | slightly mat |
| 12 | 99.5 | 0.5 | 17.75 | 72 | clear |
| 13 | 98 | 2 | 17.95 | 62 | " |
| 14 | 95 | 5 | 17.3 | 44 | " |
| 15 | 90 | 10 | 17.3 | 49 | " |
| 16 | 80 | 20 | 17.3 | 94 | slightly mat |
| | | ionogenic monomer No. 1 | | | |
| 17 | 99.8 | 0.2 | 18.4 | 126 | slightly mat |
| 18 | 99.5 | 0.5 | 18.0 | 81 | slightly mat |
| 19 | 98 | 2 | 18.4 | 58 | clear |
| 20 | 95 | 5 | 18.4 | 45 | clear |
| 21 | 90 | 10 | 18.8 | 53 | clear |
| 22 | 80 | 20 | 17.8 | 41 | clear |

We claim:

1. A photographic element comprising a support and one or more hydrophilic colloid layers including at least one light-sensitive silver halide emulsion layer, wherein at least one of said hydrophilic colloid layers is formed from a coating composition comprising a mixture of an aqueous solution of gelatin and a latex of a copolymer of ethyl acrylate, characterized in that the copolymer comprises 90 to 98% by weight of ethyl acrylate units and 2 to 10% by weight of units of an ionogenic comonomer corresponding to the general formula:

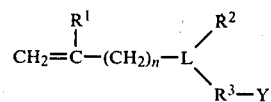

wherein:
$R^1$ is hydrogen or methyl,
n is 0 or an integer from 1 to 20,
L is a trivalent linking moiety of the group consisting of

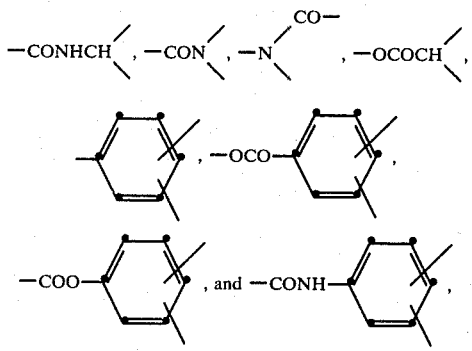

$R^2$ is a hydrogen atom or an aliphatic branched or unbranched, saturated or unsaturated hydrocarbon group,
$R^3$ is a monovalent chemical bond or a bivalent aliphatic hydrocarbon group, which may be interrupted by the group —COO— or —CONR—, wherein R is hydrogen or $C_1$-$C_4$ alkyl,
Y is a hydrophilic group selected from sulpho, sulphato and phosphono in acid or salt form, wherein at least one of the groups represented by —($CH_2$)$_n$—, $R^2$ and $R^3$ is or comprises a hydrocarbon chain of at least 8 C-atoms,
and wherein the copolymer particles in said latex have an average diameter of less than 100 nm.

2. A photographic element according to claim 1, wherein the latex is added to the aqueous gelatin-containing coating composition in an amount such that between 15 and 25% by weight of dry copolymer particles are present with respect to the combined dry weight of gelatin and copolymer particles.

3. A photographic element according to claim 1, wherein the layer formed from a coating composition comprising a mixture of an aqueous solution of gelatin and said latex is the light-sensitive silver halide emulsion layer.

* * * * *